United States Patent [19]

Robbi et al.

[11] 4,408,296
[45] Oct. 4, 1983

[54] DIGITAL TIMING SYSTEM FOR SPARK ADVANCE

[75] Inventors: Anthony D. Robbi, Hopewell; Joseph O. Sinniger, Pennington, both of N.J.

[73] Assignee: RCA Corporation, New York, N.Y.

[21] Appl. No.: 181,941

[22] Filed: Aug. 27, 1980

[51] Int. Cl.³ .......................... F02P 5/14; G06M 3/02
[52] U.S. Cl. .................................. 364/569; 123/416; 123/418; 364/431.12
[58] Field of Search .................. 364/431.05, 431.06, 364/431.12, 569; 123/416, 418, 480, 486

[56] References Cited

U.S. PATENT DOCUMENTS

| | | | |
|---|---|---|---|
| 3,906,207 | 9/1975 | Rivere et al. | 364/425 |
| 3,964,443 | 6/1976 | Hartford | 364/431.05 X |
| 4,009,378 | 2/1977 | Sakamoto | 123/416 |
| 4,018,197 | 4/1977 | Salway | 123/416 |
| 4,036,190 | 7/1977 | Bigliani et al. | 123/416 |
| 4,249,493 | 2/1981 | Honig et al. | 123/416 |
| 4,262,644 | 4/1981 | Walker et al. | 123/418 |
| 4,284,045 | 8/1981 | Maier | 123/416 |
| 4,296,471 | 10/1981 | Goux | 123/418 X |

FOREIGN PATENT DOCUMENTS

| | | |
|---|---|---|
| 2900111 | 7/1980 | Fed. Rep. of Germany . |
| 1370105 | 10/1974 | United Kingdom . |
| 1482626 | 8/1977 | United Kingdom . |

Primary Examiner—Felix D. Gruber
Attorney, Agent, or Firm—J. S. Tripoli; R. L. Troike; R. E. Smiley

[57] ABSTRACT

A means to set spark timing in accordance with engine speed includes a counter to count clock pulses between engine speed reference pulses. A read-only memory has successive memory locations storing an addend quantity and a repeats number. An adder unit, including an accumulator, operates to access the memory locations, and to add the addend quantities to the contents of the accumulator repeatedly a number of times equal to the respective repeats numbers. A comparator produces an ignition firing pulse when the contents of the accumulator corresponds with the reference period number provided by the counter. Improved memory addressing means facilitates altering the spark advance in accordance with a sensed condition such as manifold vacuum, and conserves memory space.

7 Claims, 4 Drawing Figures

Fig. 4

| POINT | SPEED RPM | P PERIOD $\mu S$ | A ADVANCE ANGLE | A $\mu S$ | P−A=S SPARK $\mu S$ | $\frac{\Delta P}{\Delta S}$ SLOPE | FRACTIONAL ADDENDS | INTEGRAL ADDENDS |
|---|---|---|---|---|---|---|---|---|
| ⓞ | 1,000 | 30,000 | 0° | 0 | 30,000 | | | |
| | | | | | | 1.0000 | 16.00 = | 16 X 1.00 TO MAX COUNT, MIN. RPM |
| ① | 1,395 | 21,505 | 0° | 0 | 21,505 | | | |
| | | | | | | 0.0000 | 0.00 = | 0.0 X 1.00 AT 21,505 |
| ② | 1,395 | 21,505 | 11.5° | 1,374 | 20,131 | | | |
| | | | | | | 0.8498 | 13.60 = | 14 X 0.60 + 13 X 0.40 TO 21,505 |
| ③ | 1,953 | 15,360 | 28.8° | 2,458 | 12,902 | | | |
| | | | | | | 1.1348 | 18.16 = | 19 X 0.16 + 18 X 0.84 TO 15,360 |
| ④ | 4,882 | 6,145 | 40.0° | 1,365 | 4,780 | | | |
| | | | | | | 1.2856 | 20.57 = | 21 X 0.57 + 20 X 0.43 TO 6,145 |
| ⑤ | INFINITE | 0 | 0° | 0 | 0 | | | |

DIGITAL TIMING SYSTEM FOR SPARK ADVANCE

This invention relates to digital timing systems useful for determining spark advance according to speed of internal combustion engines, and is an improvement on the invention in application Ser. No. 161,454 filed June 20, 1980 and now U.S. Pat. No. 4,375,209, by the same inventors.

The timing of the electrical spark in the spark plug of an internal combustion engine is varied, relative to the time the piston is at top dead center, in accordance with engine speed. The spark advance is increased as engine speed increases. In the past, the increase in spark advance with engine speed has been accomplished mechanically in the distributor by centrifugal means including springs and cams. Recently, the determination of spark advance in accordance with engine speed has been accomplished by electronic means including means for sensing engine speed, and a small computer for computing the proper spark advance at the sensed engine speed. Even though small computers can be made inexpensively by techniques of large scale integration, there is a powerful competitive necessity to make automotive components as inexpensive as possible. Accordingly, there is a need for a special-purpose electronic digital timing system, useful for spark advance determination, which is less expensive in large quantities than a system including a general purpose microcomputer.

The above-mentioned patent application, Ser. No. 161,454, describes a timing system in which an engine reference period, corresponding with an engine speed, is measured by counting by one the number of clock pulses occurring during the period. A table of addend quantities and corresponding repeats quantities are stored in a read-only memory. The addend quantities are added and accumulated in an adder operating at a frequency equal to a submultiple of the clock. When a sum value is reached corresponding with the number of clock pulses counted during the preceding engine reference period, an output timing pulse is generated. The addend and repeats quantities stored in the read-only memory are selected to make the output timing pulse occur at a time appropriate for the particular engine speed.

In accordance with an example of the present invention, at least two spark timing versus engine speed characteristics are provided for, and the characteristic which is used at any particular time is determined by a sensed condition, such as intake manifold vacuum. The two characteristics are defined by two respective tables of addend quantities and corresponding repeats quantities in the read-only memory. A manifold vacuum transducer in the engine determines the beginning address of the appropriate one of the two tables in the memory. Memory space is conserved by means responsive to a jump command in an accessed memory storage location to access another memory storage location.

In the drawing:

FIG. 4 is a table of values corresponding with the example illustrated by the charts of FIGS. 2 and 3.

Figure 1:
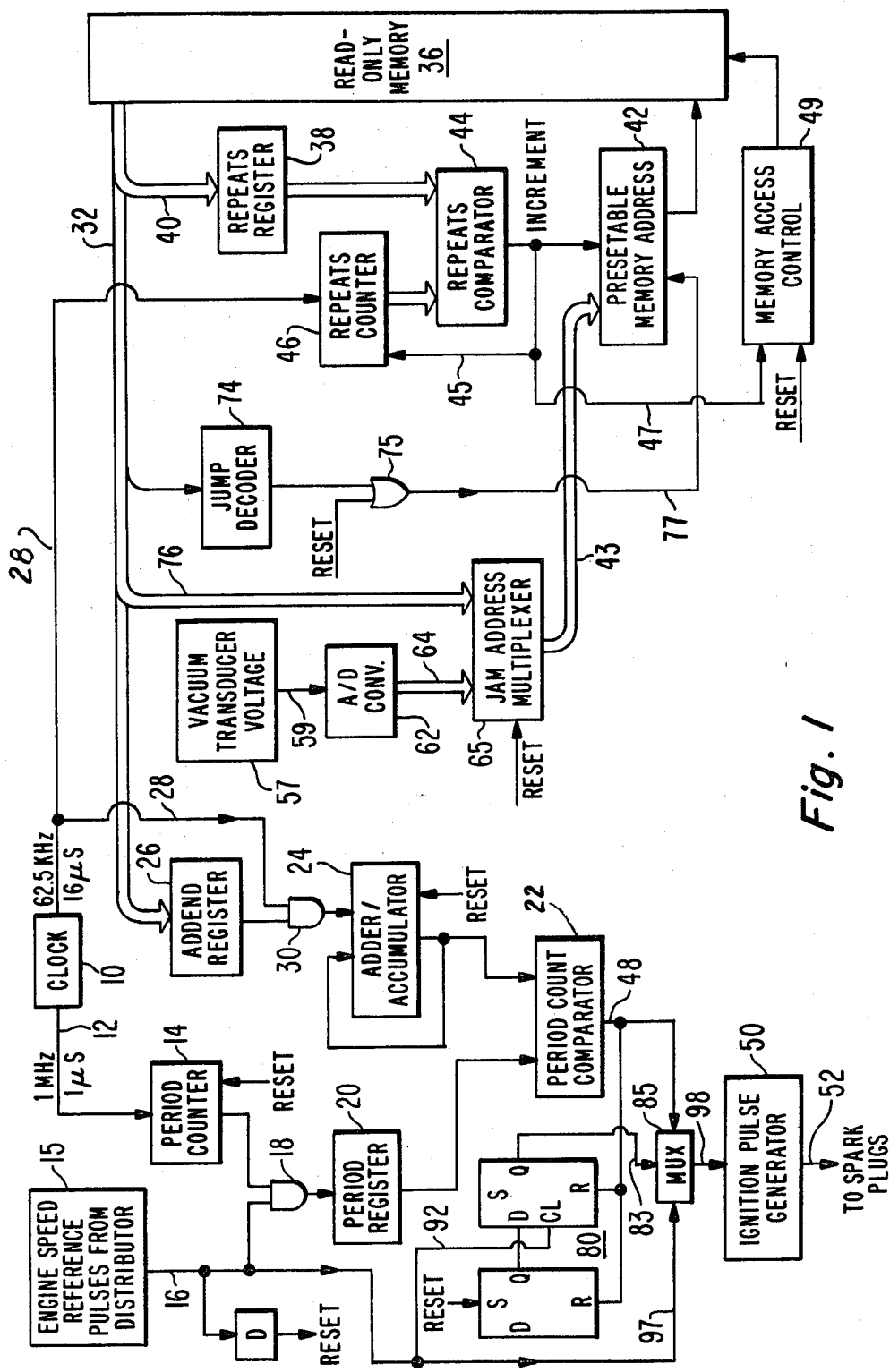
FIG. 1 is a simplified block diagram of an exemplary timing system constructed according to the teachings of the invention.

Referring now in greater detail to FIG. 1, a clock 10 has an output 12 providing pulses at a frequency of 1 MHz (a period of 1 $\mu$s) which is connected to the signal input of a period counter 14. The counter 14 is reset via delay means D every time an engine speed reference pulse is received on input terminal 16 from the ignition distributor 15.

The counter 14 continues counting until a next input pulse is received at 16 and enables an "and" gate 18 to transfer the count in counter 14 to a period register 20. After a slight delay provided by delay unit D, the input pulse produces a reset signal RESET which resets the counter 14 so that it can count the time period to the next following input pulse while the count reached during the last period is retained in period register 20.

The engine speed reference period between input pulses from the distributor depends on the speed of the engine in revolutions per minute (RPM), the number of cylinders of the engine, and whether the engine is a four-cycle, or a two-cycle engine. In the case of a four-cycle, four-cylinder engine, the reference period P in microseconds ($\mu$s) is equal to 30,000,000÷RPM of the engine. The periods P at six different values of RPM are given in the table of FIG. 4. The number of one-microsecond spaced clock pulses counted by counter 14 between two successive period reference pulses from input terminal 16 represents the reference period in microseconds at the existing engine speed.

The number in the period register 20 is continuously compared in period count comparator 22 with the number in an adder/accumulator 24. The number in 24 is produced by adding the number in an addend register 26 to the previous number in 24 every time one of the 16-microsecond-spaced clock pulses from clock 10 is applied over line 28 to enable an "and" gate 30. The addend register 26 is loaded over bus 32 from a read-only memory 36 at the same time that a repeats register 38 is loaded over bus 40 from the memory. The numbers supplied to addend register 26 and repeats register 38 come from a memory location having the address contained in a presetable memory address counter 42.

The apparatus of FIG. 1 differs from the apparatus in application Ser. No. 161,454 in the means provided for jamming new addresses into the memory address counter 42. A first address may be supplied from a vacuum transducer 57, through an analog-to-digital converter 62 and a jam address multiplexer 65 to the memory address counter 42, when enabled by a reset pulse. Thereafter, the address in counter 42 is incremented by an incrementing signal from repeats comparator 44. The accessing of numerically sequential memory locations may be interrupted by the accessing of a memory location containing a jump command and a new address anywhere in memory. The jump command is recognized by a jump decoder 74 which provides a signal through "or" gate 75 and line 77 to enable counter 42 to receive a new jump-to address via bus 32, bus 76, multiplexer 65 and bus 43.

The number in the repeats register 38 is continuously compared in a repeats comparator 44 with the count in a repeats counter 46 which counts the sixteen-microsecond-spaced clock pulses on line 28 from clock 10. When an equality is detected, the repeats comparator 44 increments the count in the memory address counter 42, and resets the repeats counter 46 over path 45, and supplies a control signal over path 47 to a memory access control unit 49, so that the memory 36 is caused to supply new numbers to the addend register 26 and repeats register 38.

When the number in the adder/accumulator 24 equals the number in period register 20, the period count comparator 22 provides an output signal at 48 through a multiplexer 85 to an ignition pulse generator 50 to control the leading edge and duration of an ignition pulse applied over path 52 to spark plugs (not shown). If for any reason the period count comparator 22 does not provide a spark advance timing signal at output 48, a time-out circuit 80 acts through line 83 to cause a spark timing signal without advance to be supplied from reference pulse source 15 over lines 16 and 97 and through multiplexer 85 to the ignition pulse generator 50.

Figure 2:
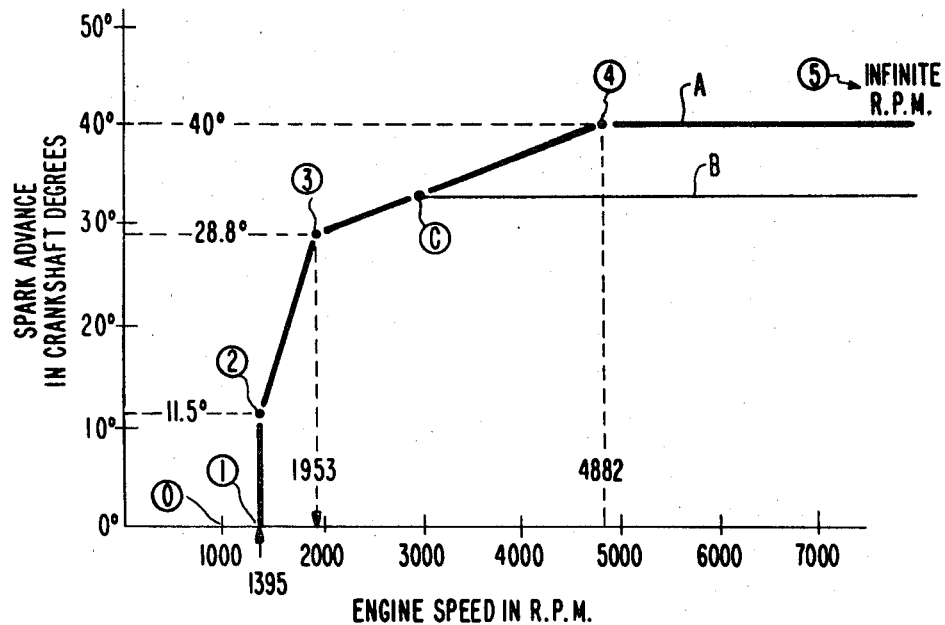
FIG. 2 is a chart showing an example of desired spark advance in crankshaft degrees for various values of engine speed in revolutions per minute.

FIG. 2 is an example of desired amounts of spark advance in crankshaft degrees for engine speeds between 1,000 rpm and 7,000 rpm. Specific points on the curve A on the chart are labeled by circled numbers zero through 5 to identify correspondingly-labeled points in the chart of FIG. 3 and the table of FIG. 4. The value of RPM at the identified points in FIG. 2 are translated to corresponding values of reference interval or time period in FIGS. 3 and 4. The time period P between ignitions in a four-cycle, four-cylinder engine is given by P=30,000,000÷RPM, where P is time in microseconds. For example, an engine speed of 1,000 rpm corresponds with an ignition reference period of 30,000 μs, or the time required to count 30,000 pulses of one-megacycle clock.

The crankshaft degrees of spark advance in FIG. 2 can be translated to the time domain by the formula A=spark advance in crankshaft degrees÷180 times P, where A equals spark advance in microseconds and P is as identified above. The values of spark advance in terms of degrees and the corresponding values in microseconds are given in the table of FIG. 4.

Figure 3:
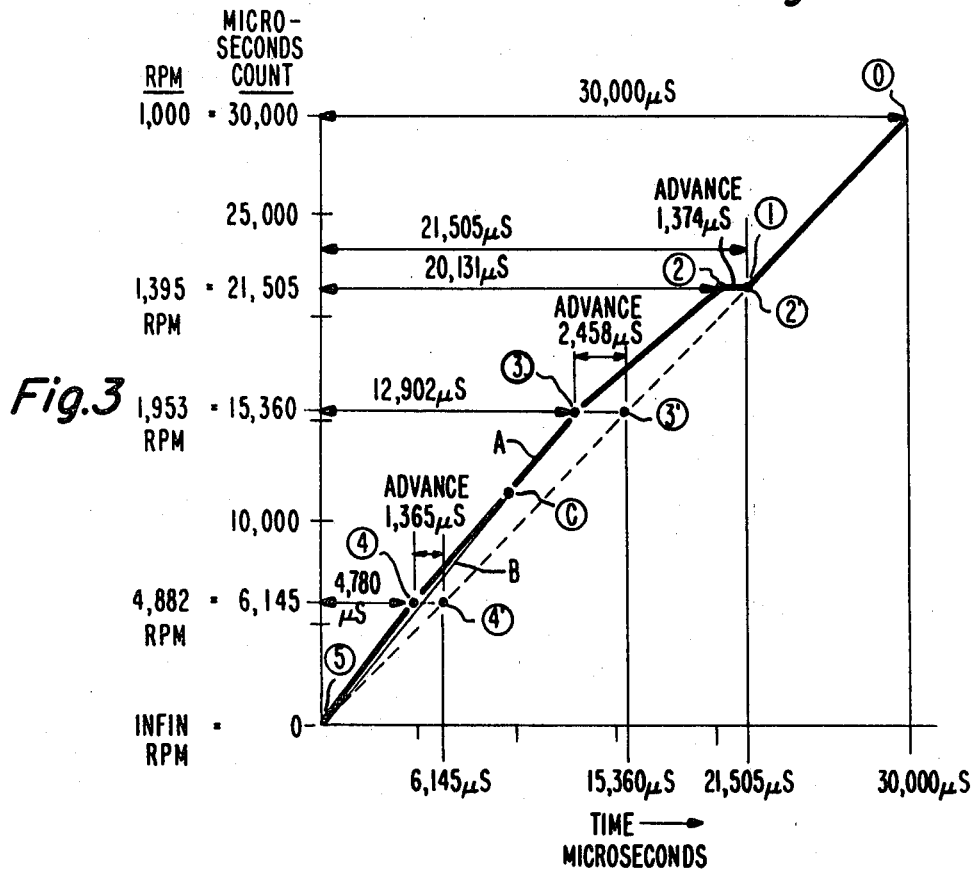
FIG. 3 is a chart which will be referred to in describing the operation of the timing apparatus of FIG. 1 in providing the exemplary desired spark advance timing shown in the chart of FIG. 2.

In FIG. 3, the ordinate is marked with the five values of RPM, from FIG. 2, and the corresponding values of reference time period in terms of a count of one-microsecond-spaced clock pulses. The abscissa is marked with the same five values of time in microseconds. The operation of the apparatus of FIG. 1 will be described with references to FIG. 3. The operation will be understood if it is remembered that the output 12 of clock 10 in FIG. 1 provides high-frequency pulses having a period of one microsecond, and that the output 28 of clock 10 provides sub-multiple frequency pulses having a period of sixteen microseconds. The count in period counter 14 increases by one every microsecond, and the output of adder/accumulator 46 increases by the amount in the addend register 26 every sixteen microseconds. If the number sixteen is in the addend register, the output of the adder/accumulator reaches the number stored in the period register 20 in the same number of microseconds as were required by the period counter to count to the number latched in the period register. If the number in the addend register is greater than sixteen, the output of the adder accumulator will reach the count latched in the period register in a shorter time. This shorter time is made to be the time to start the spark in the engine to provide a desired amount of spark advance for the speed of operation of the engine.

The operation of the basic apparatus included in application Ser. No. 161,454 will first be described for the condition represented by point 4 in FIGS. 2, 3 and 4 in which the engine is operated at a speed of 4,882 rpm, and the engine speed reference period between two successive pulses at 16 from the distributor is 6,145 microseconds. During this reference time period, counter 14 counts to 6,145, and this count is transferred to, and stored in, the engine period register 20. It is known from FIG. 2 that at the 4,882 rpm engine speed, the spark advance should be 40 degrees. It is known from FIG. 4 that a 40 degree spark advance is equal to 1,365 microseconds, and that the spark should occur at a time of 1,365 microseconds before an engine period reference pulse, or 4,780 microseconds after an engine period reference pulse. The engine period reference pulses are spaced 4,780+1,365=6,145 microseconds. This is illustrated in FIG. 3 by the time of 4,780 μs to point 4, and the time of 1,365 μs between points 4 and 4′, and the total time to point 4′ of 6,145 μs.

In operation, a spark fire signal is generated by period count comparator 22 when the output of adder/accumulator 24 equals or exceeds the count previously transferred to period register 20 and which represents the 6,145 microseconds period between input pulses at an engine speed of 4,882 rpm. The output of the adder/accumulator 24 reaches the count of 6,145 after only 4,780 microseconds because of the value of the addend which is supplied to the addend register 26 from the read-only memory 36, and the frequency with which the addend is added to the sum in the accumulator. In the example being described, the number in the addend register 26 is added to the number in the accumulator every sixteen microseconds as determined by the output 28 from clock 10. Therefore, if the number in the addend register is greater than sixteen, the output of adder/accumulator 24 will reach the count in period register 20 in less than 6,145 microseconds between the period reference pulses from the distributor. In the example, if the number in the addend register is 20.57 the output of adder/accumulator reaches the count of 6,145 after a time period of 4,780 microseconds. When this equality occurs, the output of the comparator 22 causes an ignition spark at a time providing a spark advance of 1,365 microseconds, which is equal to a spark advance of forty crankshaft degrees.

The operation is one in which during the 6,145 microsecond period between input period pulses, the period counter 14 counts to 6,145, and during the first 4,780 microseconds of the following period between input period pulses, the output of adder/accumulator 24 reaches the count of 6,145 to determine the time to fire the ignition. This may be visualized as a counting by period counter 14 from the ordinate in FIG. 3 to a count of 6,145 at point 4′ in a time period of 6,145 microseconds, and an accumulation in adder/accumulator 24 from the ordinate to a sum of 6,145 at point 4 after 4,780 microseconds. The slope of the dotted line from the ordinate to point 4′ is unity, and the slope of the solid line from the ordinate to point 4 is 6,145÷4,780, or 1.2856. The quantity in the addend register 26 should be 16×1.2856 or 20.57, and the quantity in the repeats register 38 for the number of times this quantity 20.57 should be repeatedly added in adder 24 is 6,145÷20.57 or 299 times.

However, it is desirable to limit the size of the addend and repeats numbers to base ten numbers of 255 or less which can be represented by eight binary digits. This can be done by limiting the addend quantities to whole numbers between zero and 255, such as 20 and 21, and by limiting the repeats quantities to numbers below 256. In the example of operation at an engine speed of 4,882 rpm, the count of 6,145 can be reached by adding the number twenty-one in the adder/accumulator 57% of the time, and adding the number twenty 43% of the time. That is, the quantity 21 is put in addend register 26 and the quantity 170 is put in the repeats register 38, so that the quantity 21 is added to itself 170 times, to reach a count of 3,570. Then the quantity 20 is put in the addend register 26 and the quantity 129 is put in the repeats register, so that the quantity 20 is added 129 times to the quantity 3,570 to reach a total of over 6,145, when an ignition spark is started.

The first storage location in read-only memory 36 contains the addend quantity 21 and the repeats quantity 170, and the storage location has the first address provided by memory address counter 42. When the addend quantity 21 has been added to itself 170 times in adder/accumulator 24, the contents of repeats counter 46 equals the contents 170 of the repeats register 38, and the repeats comparator 44 provides an output which increments by one the count in the memory address register, resets the repeats counter 46 and stimulates the memory access control 49. Then, the second storage location in read-only memory 36 is accessed and the addend quantity 20 therein is transferred to the addend register 26, and the repeats quantity 129 therein is transferred to the repeats register 38. The addend quantity 20 is added to sum 3,570 in the adder/accumulator, and then added another 128 times, until the repeats counter 46 counts up to the figure 129 which equals the quantity 129 in the repeats register 38. The repeats comparator 44 detects the equality and increments the memory address counter for the accessing of the next or third storage location in memory 36.

However, after the addend quantity 20 is added in the adder/accumulator 34 the 129th time, the output 48 of the adder/comparator equals 6,150, which exceeds the quantity 6,145 in the period register 20. This is recognized by the period count comparator 22, which produces an output at 48 that causes the generation of the ignition pulse with a spark advance of 1,361 microseconds or 39.9 degrees, which is close enough to the exact spark advance of 1,365 microseconds or 40 degrees, which is desired for an engine speed of 4,882 rpm. The next input pulse at 16 from the distributor initially transfers the 6,145 count in period counter 14 to period register 20 through "and" gate 18, and then the slightly delayed reset pulse RESET resets the period counter 14, the add/accumulator 24, the memory address counter 42 and stimulates the memory access control unit 49. Then, the described procedure repeats the counting the one-microsecond-spaced clock pulses until the next input pulse is received, and adding and accumulating addend quantities from memory 36 until an equality sensed by the period count comparator 22 causes another ignition spark. The process keeps repeating exactly as described, and provides a spark advance of 1,365 microseconds, or 40 degrees so long as the engine operates at a speed of 4,882 rpm.

If, for example, the engine is operating at a speed of 1,953 rpm, corresponding with the points 3 in FIGS. 2, 3 and 4, the time between input pulses from the distributor is 15,360 microseconds, and period counter 14 counts to this figure, and stores the number in period register 20 by the time the following input pulse is received. This corresponds with a movement from the origin in FIG. 3 to the circled point 3'.

During the interval until the next input pulse is received, the output of the adder/accumulator 24 increases exactly as has been described to a count of 4,780, which corresponds to a movement from the circled point 5 at the origin in FIG. 3 to the circled point 4, and then continues, using addends and repeats quantities from third and subsequent storage locations in memory 36, until the circled point 3 is reached. The slope of the line from point 4 to point 3 is 1.1348 as shown in FIG. 4, and addends should average 1.1348 times 16 or 18.16. This is accomplished by using an addend of 19 sixteen percent of the time and an addend of 18 eighty-four percent of the time. The number at the output of the adder/accumulator 24 reaches the number 15,360 in the period register 20 after a time of 12,902 microseconds, which is the time to start ignition when the engine speed is 1,953 rpm, and a spark advance of 2,458 microseconds, or 28.8 degrees, is desired.

If the engine speed is 1,395 rpm, the system goes through the counting and adding as described for the higher speeds and continues to the circled points 2 and 2' in FIG. 3, and causes a spark to start after 20,131 microseconds, which corresponds with a spark advance of 1,374 microseconds or 11.5 crankshaft degrees.

At engine speeds a trifle lower than 1,395 rpm, the output of the adder/accumulator 24 adds addends from addend register 26 to follow the solid curve in FIG. 3 from the origin through circled points 4, 3 to point 2, where the output count is 20,131, as has been described. Then, in going from circled point 2 to circled point 1, the output count should remain at 20,131. This is accomplished by using an addend from memory which is equal to zero for 1,374 microseconds, the period of time necessary to go from 20,131 microseconds to 21,505 microseconds. The contents of the addend register is used once every 16 microseconds, so the repeats number from memory 36 to the repeats register 38 should be about 86. Thus, the start of ignition spark is delayed until the spark advance is zero.

Then, at all lower engine speeds, more than a trifle less than 1,395 rpm, the spark advance remains at zero. This is accomplished by using an addend from memory equal to 16. Then at all lower engine speeds, the output of the adder/accumulator reaches the count in the period register 20 in the same period of time previously required for the period counter 14 to reach the same number. This is the condition represented in FIG. 3 by the solid line having a slope of unity between circled points 1 and 0.

The operation of the apparatus according to the present invention, by which new addresses may be jammed into the presetable memory address counter 42, will now be described.

At reset time, the address counter 42 receives the first address of a table in memory corresponding with a spark advance versus engine speed characteristic appropriate for the existing intake manifold vacuum as sensed by the transducer 57. The voltage from transducer 57 is translated in analog-to-digital converter 62 to a digital address which is passed through multiplexer 65 and bus 43 to the presetable memory address counter 42. The address in the counter 42 may then be the first address of a table in memory corresponding with the characteristic A in FIG. 2 in which case the operation is as above described and as described in the aforementioned U.S. patent application Ser. No. 161,454. Alternatively, depending on the manifold vacuum, the address jammed into counter 42 may be the first address of a table in memory corresponding with the characteristic B, which, it will be noted from FIG. 2, is the same as characteristic A from circled point C to circled point 0. By way of example the first address for characteristic A may be 001 with following addresses 002, 003, etc., while the first address for characteristic B may be 101 with the following addresses 102, 103, etc. The contents of memory 36 address 001 may include eight bits representing a repeats number such as 170 and eight bits representing an addend number such as 21 to utilize an example previously given. Similarly, the contents of memory 36 address 002 may include eight bits representing a repeats number such as 129 and eight bits representing an addend number such as 20. Similarly, addresses 003, 004, 005, and 006 may contain repeats numbers 032, 180, 046, 249 (base 10), respectively, and addend numbers 19, 18, 19, 18, (base 10), respectively, to comply with the earlier stated requirement regarding characteristic A between circled points 3 and 4 that the addend number 19 be utilized 16% of the time and the addend number 18 be utilized 84% of the time. The numbers contained in addresses 003 and 004 represent, with reference to FIG. 2, characteristic A between circled points 4 and C while the numbers in addresses 005 and 006 represent, with reference to FIG. 2, characteristic A and, for that matter, characteristic B, between circled points C and 3.

From a review of FIG. 2 it will be noted that circled point C is at 3,000 rpm corresponding with 32.8° spark advance in crankshaft degrees utilizing linear interpolation of the data in FIG. 4. Using calculations similar to those utilized in FIG. 4, addresses 101, 102, and 103 may contain, by way of example, the following repeats numbers, respectively: 144, 222, 145, and the following addend numbers, respectively: 20, 19, 20. Utilizing these numbers in the system of FIG. 1 in the manner above described in connection with characteristic A, FIG. 2, will produce a spark advance of 32.8° at 3,000 rpm.

If the initial address in counter 42 is the first address of characteristic B (e.g., 101), the contents of successive memory locations cause an operation of the system corresponding with a movement to the left from circled point 5 at infinity along line B in FIG. 2, or a movement upward and to the right from circled point 5 along line B in FIG. 3. When the circled point C is reached, repeats comparator 44 produces an increment pulse to increment memory address 42 to the next address in memory 36, for example, address 104. It will be noted from a review of FIG. 2 that, beyond circled point C, characteristics A and B are identical and therefore there is no need to duplicate for characteristic B the table of addend and repeats numbers for characteristic A in memory 36. Therefore, address 104 will contain a unique code representing a jump-to instruction and a memory address to be jumped to. Thus, memory address 104 may have, by way of example, as a repeats number 000 (base 10) and as an addend number 005 (base 10). The number 005 is the address to be jumped to in memory 36 which contains the first of a series of addend and repeats numbers representing both characteristics A and B, FIG. 2. The repeats number 000 is the unique code chosen with consideration to the fact that an actual repeats number of 000 is meaningless.

The jump command 000 is recognized by jump decoder 74, and its output applied through "or" gate 75 to memory address counter 42 causes the new address to be passed over bus 76 and through multiplexer 65 and be jammed into the memory address counter 42. In operation, the system then follows the characteristic curve A from circled point C to circled point 1. The described construction and operation permits a saving in memory space which would otherwise be needed to duplicate the common portions of the two characteristics.

A second way in which memory space may be conserved is by making the system jump to another memory location in the same table utilizing a special jump-to command as above described which contains a unique jump-to code such as 000 (base 10) and the address in memory 36 to which the jump is to occur. The jump back may be to the next preceding memory location, so that the system loops around and repeatedly accesses the same addend quantity and corresponding repeats quantity. In this way, the last straight line portion (at the low RPM end) of a characteristic in FIG. 3 may be followed without using all the memory locations otherwise needed.

A third way in which memory space may be conserved is by inserting a jump command in a memory location corresponding with the circled point 1 in FIGS. 2 and 3, together with the address of a memory location storing addends equal to zero. When this memory location is reached, the adder/accumulator 24 and comparator 48 never produce a spark advance output, and consequently a zero spark advance signal is provided over line 97 to the ignition pulse generator.

What is claimed is:

1. A system for producing an output pulse at a time which is a function of the spacing of two time spaced input pulses comprising, in combination:

first means producing time spaced clock pulses;

second means receptive of said clock pulses and said two time spaced input pulses for determining the time period between said two time spaced input pulses and for storing a signal whose value corresponds to said time period;

a memory having at least two groups of addressable locations, a first group of which stores a first group of addend and repeats numbers in successive locations thereof, a second group of which stores a second group of addend and repeats numbers in successive locations thereof, said memory including a memory address counter;

third means dependent on a sensed condition to jam into said memory address counter the address of a first location of one of said at least two groups of locations, said first location address being dependent on the value of the sensed condition;

fourth means operative after said signal is stored in said second means for changing the addresses in said memory address counter for reading out in succession addend and repeats numbers of the group thereof, the address of the first location of which was jammed into said memory address counter;

fifth means for accumulating each said readout addend number a number of times determined by its corresponding repeats number at a rate which is a function of the spacing of said clock pulses; and sixth means producing an output pulse when the value accumulated in said fifth means corresponds with said value in said second means.

2. A system according to claim 1 wherein said third means includes a manifold vacuum transducer.

3. A system according to claim 1 wherein at least one of said memory locations includes a jump code and the address of a memory location, and said system includes a jump decoder to recognize said jump code and jam the associated address into said memory address counter.

4. A system according to claim 3 wherein said one of said memory locations is in one of said groups of memory locations and contains an address of a memory location in another one of said groups of memory locations.

5. A system according to claim 3 wherein said one of said memory locations is in one of said groups of memory locations and contains an address of a memory location in the same one of said groups of memory locations.

6. A system according to claim 3 including a multiplicity of time spaced input pulses wherein said output pulse from said sixth means is advanced in time therein relative to a referenced one of said input pulses, and said system includes means operative in the absence of an output pulse from said sixth means and to said reference input pulse to generate a non-advanced output pulse.

7. A system according to claim 1 including a multiplicity of time spaced input pulses wherein said output pulse from said sixth means is advanced in time relative to a referenced one of said input pulses, and said system includes means operative in the absence of an output pulse from said sixth means and to said reference input pulse to generate a non-advanced output pulse.

* * * * *